United States Patent [19]

Budzinski et al.

[11] 3,760,724

[45] Sept. 25, 1973

[54] FAST-SET PLASTISOL INK

[75] Inventors: David A. Budzinski, Euclid; Jack L. Sorkin, University Heights; Clarence E. Charogoff, Cleveland, all of Ohio

[73] Assignee: Addressograph-Multigraph Corporation, Cleveland, Ohio

[22] Filed: Apr. 23, 1971

[21] Appl. No.: 136,996

[52] U.S. Cl.................. 101/426, 101/450, 106/32, 260/30.6, 260/31.6, 260/31.8 H
[51] Int. Cl.............................................. B41m 1/06
[58] Field of Search................ 260/DIG. 38, 33.6 U, 260/669 P; 106/32; 101/450, 426

[56] References Cited
UNITED STATES PATENTS
3,024,213  3/1962  Ludlow............................ 260/41 R FOREIGN PATENTS OR APPLICATIONS
643,463  9/1950  Great Britain............... 260/DIG. 38

OTHER PUBLICATIONS

Boundy et al., Styrene Its Polymers, Copolymers and Derivatives, Reinhold Pub. Corp., 1952, New York, pages 822–823, TP986.S7B6C.5

Zimmerman et al., Handbook of Material Trade Names, Industrial Research Service, 1953, Dover, New Hampshire, pages 443–444, TP151Z51953C.7

Primary Examiner—Allan Lieberman
Assistant Examiner—J. H. Derrington
Attorney—Russell L. Root and Ray S. Pyle

[57] ABSTRACT

A non-volatile, fast-set, heat-dry plastisol vehicle for printing inks is provided comprising a finely divided, substantially water-insoluble, thermoplastic, film-forming polyvinyl resin that is solid at room temperatures dispersed in a sufficient amount of a single compatible liquid plasticizer to form a plastisol, and an effective amount of a tackifying agent consisting essentially of liquid polystyrene to inhibit "flying" of the plastisol from a printing press and the like. After application to a backing member, usually paper stock, in a printing operation, the plastisol is heated above the softening temperature of the polyvinyl resin which then swells and effectively absorbs the liquid plasticizer and liquid polystyrene. Preferably, the polyvinyl resin is pigmented to provide a contrasting color with respect to the backing member on which it is printed. The use of liquid polystyrene as a tackifying agent reduces not only the number of different plasticizers needed but also the total amount of plasticization as compared to prior practice.

5 Claims, No Drawings

FAST-SET PLASTISOL INK

BACKGROUND OF THE INVENTION

One popular class of inks used in printing comprises basically a pigment, such as lamp black, and a binder which are suspended or dissolved in a liquid vehicle. After application of the liquid ink in a desired image or configuration on paper or the like, the liquid vehicle evaporates at room temperature. The binder coats the pigment and binds it to the surface of the paper in the desired image without unduly penetrating the paper. Thus, the ink is said to dry.

In contrast, another class of inks is heated after application to a receiving surface to set the image in which the ink is applied and such inks are, accordingly, termed heat-set or heat-dry inks. These inks are essentially mixtures of oleo-resinous varnishes, such as linseed oil, driers, oils, and other waxy or greasy components. All are present in a liquid vehicle. Heat-set inks are preferred in many applications because of their good gloss, relatively rapid drying, and their ability to be applied to non-absorbent stock with reduced danger of ink set-off between said adjacent sheets after printing.

Because of the volatile vehicle or solvent present, heat-set inks require relatively large ovens and/or solvent collection devices when the ink is set. Heat-set inks are also objectionable in that normally a two stage drying operation is required. In the usual printing operation, heat is applied to a heat-set ink immediately after it is printed onto paper stock or the like to drive off the solvent. The drying of the ink, however, is not complete at this stage. A second drying stage is required in which a drying oil or the like subsequently hardens as by oxidation and/or polymerization. The heat-set inks are not smudge resistant after the first stage of drying, and satisfactory resistance to smudge is usually not acquired until after the second drying stage. In some cases, paper stock printed with previous heat-set inks are set aside to await complete drying before further operations can be performed.

Press stability is another consideration which complicates the problem of suitably drying heat-set inks that contain liquid components which must be subsequently removed as by evaporation during a first stage of drying. A relatively volatile liquid solvent or dispersant medium for the vehicle does shorten the time required for drying and improve smudge resistance of the heat-set ink. But a relatively volatile solvent also renders the ink less stable on the press. The tendency of such a solvent to vaporize more easily converts a film of ink on the printing rolls and on the surface of a fountain of the press to a hard gummy mass. Furthermore, the evaporation of a solvent alters the rheological properties and consequently the printing characteristics of the ink. Conversely, a less volatile solvent for the heat-set ink renders the ink more stable on the press but also more prone to a relatively slow dry on paper with less resistance meanwhile to smudging.

Previously, plastisols have not been successfully used for a printing ink vehicle because of their inability to transfer readily from one ink roll to another or to transfer satisfactorily to paper. In particular, plastisols are easily thrown from printing rolls due to centrifugal force, a fault that has been referred to as "flying."

U. S. Pat. No. 3,024,213 to Ludlow discloses a heat-dry ink which is said to achieve maximum hardness immediately upon being fused by heat and to undergo no further drying, oxidation, or polymerization. To accomplish these objectives, the heat-dry vehicle of the Ludlow patent requires a mixture of at least two non-volatile plasticizers of different solvating properties, each plasticizer being present from about 45 to 70 parts by weight for each 100 parts by weight of polyvinyl chloride resin, and a solid, tackifying binder having a melting point on the order of about 50° C. to 200° C., such as the acrylic resins, solid styrene resins, ketone-formaldehyde resins, resins polymerized from coal tar, and others.

The minimum amount of 90 parts by weight of two different plasticizers for 100 parts by weight of polyvinyl chloride to a maximum amount of 140 parts by weight of two plasticizers per 100 parts by weight of polyvinyl chloride in the cited Ludlow patent results in a very heavily plasticized resin. Such relatively large amounts of at least dual plasticizers not only complicates the formulation but can cause migration of the printed image after it is deposited and heat-set. In addition, the use of solid tackifying binders raises the viscosity of the plastisol and can, in fact, contribute to the need for greater amounts of plasticization. Viscous plastisols are difficult to work with as printing ink vehicles and can interrupt press runs resulting in expensive down-time.

SUMMARY OF THE INVENTION

The present invention provides a non-volatile, fast-set, heat-dry plastisol vehicle for printing inks that dries immediately upon heat treatment and is also stable on a printing press. It has been discovered that if polystyrene, of sufficiently low molecular weight to be liquid at room temperatures, is used as a tackifying agent or binder for a plastisol, only a single plasticizer for a polyvinyl resin is needed as contrasted with prior use of a plurality of plasticizers. Further, when a liquid tackifying agent of polystyrene is used, an appreciably lower range of the amounts of the single plasticizer is required to impart the desired properties of viscosity, flexibility, fusion temperature, and the like, to the plastisol.

The present fast-set, heat-dry plastisol vehicle comprises a finely-divided, substantially water-insoluble, thermo-plastic, film-forming polyvinyl resin that is solid at room temperature dispersed in a sufficient amount of a compatible liquid plasticizer to form a plastisol, and an effective amount of a tackifying agent consisting essentially of liquid polystyrene to inhibit flying or stringing of the plastisol from a printing press and the like. The vehicle preferably is pigmented to impart color, although the vehicle may be used without pigment as a clear, glossy over-print varnish.

The preferred polyvinyl resin is polyvinyl chloride, and the preferred single plasticizer is a diester of phthalic acid, each ester group being an organic chain having up to 12 carbon atoms.

DESCRIPTION OF THE PREFERRED EMBODIMENTS

Referring initially to the components of the present plastisols, in general any substantially water-insoluble, thermo-plastic, film-forming polyvinyl resin, solid at room temperatures, may be used, such as polyvinyl acetate, polyvinyl butyral, poly-vinyl chloride, polyvinylidene chloride, polyvinylidene fluoride, polyvinyl dichloride, and copolymers thereof. Those resins providing a relatively low plastisol viscosity are desired. Polyvinyl chloride is preferred. Polyvinyl alcohol cannot be used because of its water solubility. The other vinyl resins mentioned are less easily milled to fine particle sizes than polyvinyl chloride and, in this respect, plastisols may be more difficultly formed from such resins. The polyvinyl resin should be finely divided to assist in its plasticization. Particle size is not critical, but those sizes on the order of about 0.1 to about 1 micron are preferred, obtained for example by milling the resin.

It is conventional to plasticize polyvinyl resins to vary their physical properties, although in accordance with the present invention and in contrast to prior practices for plastisols used as printing vehicles, only a single plasticizer is needed to obtain desired flow characteristics, shelf life, plasticizing action, and desired fusion temperature. Among the liquid plasticizers that are best adapted for use in the present plastisols are those obtained from reacting polybasic acids with alcohols. For example, polybasic acids which may be used in producing ester plasticizers for the present invention are sebacic, phthalic, and phosphoric, while the alcohols which may be reacted with such acids are those having carbon chains containing up to about 13 carbon atoms. Such chains are usually aliphatic but can be cyclic. Specific examples of useful plasticizers include cresyl diphenyl phosphate, tricresyl phosphate, triphenyl phosphate, dibutyl sebacate, and di(2-ethylhexyl)sebacate. However, best results are obtained with plasticizers comprising a diester of phthalic acid in which each ester group comprises a carbon chain having up to about 13 carbon atoms. Specific examples of these plasticizers include: butyl octyl phthalate, di(2-butoxyethyl) phthalate, dibutyl phthalate, dicyclohexyl phthalate, diethyl phthalate, dihexyl phthalate, diisodecyl phthalate, di(2-methoxyethyl)phthalate, dimethyl phthalate, dioctyl phthalate, ditridecyl phthalate, octyl decyl phthalate, ethyl hexyl phthalate, and di(chloroethoxy ethyl)phthalate. Dibutyl phthalate, dioctyl phthalate, and butyl octyl phthalate are preferred. Still another class of useful plasticizers comprises azelaic acid polyesters that are liquid at room temperatures and have a viscosity within the range of about 100 to about 10,000 centipoises. These polyesters are sold by Emery Industries Inc. under the trademark PLASTOLEIN.

In accordance with the present plastisols, a liquid tackifying binder is used consisting essentially of liquid polystyrene. For instance, polystyrenes having a melting point within the range of about 5° C. to about 25° C. are useful. Such poly-styrenes preferably have a viscosity within the range of about 2,000 to about 300,000 centipoises. The liquid tackifying agent reduces the number of plasticizers needed to one as well as the total or absolute amount of plasticization needed. Other than the fact that the liquid tackifying agent reduces the viscosity of the plastisol, as compared to the use of a solid tackifying agent, the reasons for the surprising results obtained with liquid polystyrene are not readily apparent. It may be that the presence of an ethylenically unsaturated group common to the genesis of both a polyvinyl resin and polystyrene provides a compatible basis by which these two classes of compounds are able to cooperate so well in the present plastisols. It is also postulated that the polystyrene forms part of the lattice of the polyvinyl resin upon cooling after a heat-set.

No other material has been found that approaches the efficacy of polystyrene in the present fast-set plastisol. The primary advantages of polystyrene are that it is both a liquid and possesses the tack required. As a tackifying agent, the liquid polystyrene contributes to the desired rheological properties of the plastisol printing vehicle and, principally, provides a sufficient tackiness or stickiness that enables the plastisol to resist "flying" from printing rolls and to transfer well from roll to roll and eventually to paper or the like. The polystyrene ingredient provides the tack needed in the plastisol for this purpose while at the same time lowering its viscosity.

The use of a pigment is not critical to the invention and indeed, if desired, the platisol can be used unpigmented as a clear, over-print varnish. The role of a pigment, dyestuff, or dye is merely to impart a color to the plastisol which contrasts with the color of a surface on which the ink is printed, so that the printed image is discernible. Since white paper is normally used for printing, the pigment is usually carbon black. However, other pigments, dyestuffs, and dyes known in the art may be used, such as powdered metals like bronze or aluminum powder or oxides like zinc oxide, care being taken not to load the plastisol so as to make it too viscous. Still other known inorganic pigments can be used such as Ultramarine Blue, Scarlet Chrome, and Prussian Blue. Other known colorants such as Red Lake C and Peacock Blue may be used. Different pigments or dyestuffs affect flow characteristics of the plastisols differently. Accordingly, some colorants may be used in greater amounts than others within the range hereinafter stated.

With respect to amounts, only that amount of a single liquid plasticizer need be used with the polyvinyl resin and other ingredients present to reach the plastisol state. Likewise only enough liquid polystyrene need be used to thwart the tendency of the plastisol to "fly" or "string" from printing rolls and the like. Such amounts for the plasticizer and/or tackifying agent are easily determined by trial and error.

In general, these objects are realized when, on a pigment-free weight basis, the plastisol comprises: from about 25 per cent to about 67 per cent of the polyvinyl resin, from about 7.5 per cent to about 44 per cent Of the liquid plasticizer, and from about 15 per cent to about 56 per cent of liquid polystyrene. If a pigment is used, an exemplary plastisol of the present invention contains in weight per cent: from about 10 per cent to about 20 per cent of a pigment, from about 22 per cent to about 50 per cent of a polyvinyl resin, from about 10 per cent to about 38 per cent of a liquid plasticizer, and from about 15 per cent to about 50 per cent of the liquid polystyrene. In either case, the reduced amount of liquid plasticizer that is required is striking.

If less than the indicated amount of pigment is used, there is a sacrifice of density, that is, the printed image or character is lighter in contrasting color and more difficult to discern. If more pigment is used than the maximum indicated, no more than maximum contrast is obtained and there is introduced a tendency of the printed image to smudge due to excess pigment. The minimum amount of a polyvinyl resin is needed to afford sufficient fusing and absorption of the liquids present (hereinafter discussed), while exceeding the maximum amount for the resin renders the plastisol too viscous for use as intended. The indicated minimum amount of plasticizer is found necessary to modify the polyvinyl resin, especially as to softening temperature, while exceeding the maximum amount of plasticizer results in objectionable over-plasticization with potential migration of a printed image after it has become heat-set. Similarly, the minimum amount of liquid, non-fugitive, polystyrene is needed to accomplish the objectives of this component, while exceeding the maximum amount renders the plastisol too tacky and results in waste of polystyrene.

To form a plastisol, the liquid plasticizer is mixed with the polyvinyl resin as by stirring at room temperatures (about 70° F. to about 85° F.). If a pigment is to be used, it is ground into a pulverulent state and then dispersed in the liquid polystyrene. The plasticized polyvinyl resin and pigment-liquid polystyrene are next mixed together, as by being passed between water-cooled rollers, until the plastisol state is obtained.

The present plastisol may be applied by conventional printing operations and then hardened by heat. For example, the plastisols may be used on conventional off-set for letterpress equipment and are especially designed for high speed lithographic presses, including off-set and direct lithographic presses, and driographic presses. The plastisol may be applied to a variety of backing members such as fabrics, both of natural and synthetic fibers, cardboard, plastic films, etc., but the plastisols are usually applied to paper stock by the types of presses previously mentioned.

In any case, heat is subsequently applied to set the ink on its backing member. The application of heat may be by any convenient means, such as by gas flame, electric-resistant heaters, hot plate, hot air gun, infra-red heaters, and the like. The temperature need only be sufficiently high and for a sufficient time to soften or fuse the particles of the polyvinyl resin. The particles swell and absorb into the lattice of the polyvinyl resin the liquid plasticizer and liquid polystyrene to form a uniform solution or dispersion of those ingredients. The temperature to which a plastisol is heated can range from the softening or fusion temperature of the polyvinyl resin to a temperature just short of charring the materials present. As a rule, the temperature of the heated plastisol is within the range of about 200° F. to about 400° F. depending on the nature of the polyvinyl resin, the plasticizer used, the amount of plasticization, etc. Upon cooling, a tough plastic gel results comprising a solution of the polyvinyl resin, plasticizer, and polystyrene which is smudge-resistant, adheres well to the backing member, and provides good copy.

The following examples are intended to illustrate the invention and should not be construed as imposing limitations on the claims. Percentages are by weight.

EXAMPLE 1

A plastisol of the following formulation was prepared following the described procedure of mixing together the polyvinyl resin and liquid plasticizer at room temperature, separately dispersing the ground pigment into the liquid polystyrene, and finally admixing the two resulting fractions between water-cooled rollers until a uniform plastisol state was reached:

| Component | Per Cent |
| --- | --- |
| Polyvinyl chloride | 30 |
| Dioctyl phthalate | 24 |
| Liquid polystyrene | 12 |
| Carbon black | 19 |
| Lithographic vehicle (Linseed Oil) | 15 |

The polyvinyl chloride resin had an average particle size of about 0.3 to 0.6 micron. The liquid polystyrene was purchased from the Pennsylvania Ind. Chemical Company under the trademark, Piccolastic A-25, and had a softening temperature of about 25° C. The lithographic vehicle is non-volatile and may comprise any of those liquids used in lithographic art as dispersion agents, primarily to facilitate dispersion of the pigment into the liquid polystyrene at room temperatures, such as linseed oil and bodied linseed oil. A standard lithographic vehicle may be purchased from Lawter Chemicals, Inc. under the trade designation, Grinding Base 100-S. Another known lithographic vehicle may be purchased under the trade designation, No. 8 Lithographic Varnish. These lithographic vehicles are not critical to the plastisol formulation and, indeed, may be deleted from the formulation.

EXAMPLE 2

A plastisol of the following formulation was prepared like the plastisol of Example 1:

| Component | Per Cent |
| --- | --- |
| Polyvinyl chloride | 38 |
| Dioctyl phthalate | 23 |
| Liquid polystyrene (Piccolastic A-25) | 8 |
| Carbon black | 11.5 |
| Lithographic vehicle | 19.5 |

The average particle size of the polyvinyl chloride ranged from about 0.5 to about 0.9 micron.

EXAMPLE 3

A plastisol of the following formulation was prepared like the plastisol of Example 1:

| Component | Per Cent |
| --- | --- |
| Polyvinyl chloride | 34 |
| Dioctyl phthalate | 17 |
| Liquid polystyrene (Piccolastic A-25) | 14 |
| Carbon black | 14 |
| Lithographic vehicle | 21 |

EXAMPLE 4

A plastisol of the following formulation was prepared like the plastisol of Example 1:

| Component | Per Cent |
| --- | --- |
| Polyvinyl chloride | 34 |
| Dioctyl phthalate | 10 |
| Liquid polystyrene | 21 |
| Carbon black | 14 |
| Lithographic vehicle | 21 |

The liquid polystyrene was purchased from the Pennsylvania Ind. Chemical Company under the trademark, Piccolastic A-5, and had a softening temperature of about 5° C.

EXAMPLE 5

A plastisol of the following formulation was prepared like the plastisol of Example 1:

| Component | Per Cent |
| --- | --- |
| Polyvinyl chloride | 36 |
| Dioctyl phthalate | 18 |
| Liquid polystyrene (Piccolastic A-5) | 36 |
| Carbon black | 10 |
| Lithographic vehicle (none) | |

EXAMPLE 6

A plastisol of the following formulation was prepared like the plastisol of Example 1:

| Component | Per Cent |
| --- | --- |
| Polyvinyl chloride | 42 |
| Dioctyl phthalate | 21 |
| Liquid polystyrene (Piccolastic A-5) | 25 |
| Carbon black | 8 |
| Lithographic vehicle | 4 |

EXAMPLE 7

A plastisol of the following formulation was prepared like the plastisol of Example 1:

| Component | Per Cent |
| --- | --- |
| Copolymer of vinyl chloride and vinyl acetate | 25 |
| Tricresyl phosphate | 32.5 |
| Liquid polystyrene (Piccolastic A-5) | 32.5 |
| Carbon black | 10 |
| Lithographic varnish | (none) |

The copolymer consisted of about 93 per cent of polyvinyl chloride and 7 per cent of polyvinyl acetate.

In use, all of the formulations were used in turn on an Addressograph-Multigraph Copy Duplicator and printed on paper stock which was dried by infra-red radiation. The plastisols were stable on the duplicator and immediately dried and set upon being heated. The printed images were smudge-resistant, and there was no set-off between adjacent sheets after printing.

In place of the polyvinyl chloride resin and the liquid dioctyl phthalate, any of the other polyvinyl resins and liquid plasticizers, respectively, could have been used.

The plastisol vehicles for printing inks of the present invention can be heat-set to a smudge-resistant body immediately after application by a printing operation. The plastisol vehicles do not dry by solvent evaporation or oxidation or polymerization. Accordingly, there is no need for relatively large ovens and/or solvent collection devices, since the present plastisol vehicles are composed entirely of non-volatile components. The plastisols remain stable on a press for periods of at least one month. The plastisol vehicles have good transfer between rolls of a press and to paper stock without flying or stringing.

Although the basic ingredients of the present plastisols have been described, it is understood that other ingredients such as emulsifying agents, fillers, surface tension agents, opacifiers, oxidation inhibitors, surface active agents, stabilizers, driers, surfactants, and the like, can be added as long as the function of the principal ingredients are not materially altered.

While the foregoing describes several embodiments of the present invention, it is understood that the invention may be practiced in still other forms within the scope of the following claims.

We claim:

1. In a process of printing by applying an ink in a desired configuration onto a backing member, the improvement of using for said ink a non-volatile plastisol comprising from about 10% to about 20% of a pigment, from about 22% to about 50% of a finely divided substantially water-insoluble thermoplastic, film-forming polyvinyl resin that is solid at room temperature dispersed in from about 10% to about 38% of a compatible liquid plasticizer to form a plastisol, and from 15% to about 50% of a tackifying agent consisting essentially of liquid polystyrene to inhibit flying of said plastisol during said printing, heating the plastisol after application to said member above the softening temperature of said polyvinyl resin to affect absorption of the liquid plasticizer and liquid polystyrene, and cooling to form a smudge-resistant gel on said member comprising a solution of said polyvinyl resin, plasticizer, and polystyrene.

2. The process of claim 1 wherein said pigment is carbon black.

3. The process of claim 1 wherein said polyvinyl resin is selected from the group consisting of polyvinyl acetate, polyvinyl butyral, polyvinyl chloride, polyvinylidene chloride, polyvinylidene fluoride, polyvinyl dichloride, and copolymers thereof.

4. The process of claim 1 wherein said liquid plasticizer is a diester of phthalic acid, each ester group having a carbon chain of from 1 to 13 carbon atoms.

5. The process of claim 1 wherein said liquid polystyrene has a melting point within the range of about 5° to about 25° C, and a viscosity in the range of about 2000 to about 300,000 centipoises.

* * * * *